US007620788B2

(12) United States Patent
Jeddeloh

(10) Patent No.: US 7,620,788 B2
(45) Date of Patent: Nov. 17, 2009

(54) MEMORY DEVICE SEQUENCER AND METHOD SUPPORTING MULTIPLE MEMORY DEVICE CLOCK SPEEDS

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 126 days.

(21) Appl. No.: 11/211,848

(22) Filed: Aug. 24, 2005

(65) Prior Publication Data

US 2006/0036828 A1  Feb. 16, 2006

Related U.S. Application Data

(63) Continuation of application No. 10/155,668, filed on May 24, 2002, now Pat. No. 6,983,354.

(51) Int. Cl.
G06F 12/00 (2006.01)
(52) U.S. Cl. .................. 711/167; 711/163; 711/169; 713/500; 713/501; 713/600; 713/400
(58) Field of Classification Search .................. None
See application file for complete search history.

(56) References Cited

U.S. PATENT DOCUMENTS

| 4,245,303 | A | 1/1981 | Durvasula et al. ............ 364/200 |
| 5,155,809 | A | 10/1992 | Baker et al. .................. 395/200 |
| 5,448,715 | A | 9/1995 | Lelm et al. ................... 395/550 |
| 5,471,587 | A | 11/1995 | Fernando .................... 710/307 |
| 5,487,092 | A | 1/1996 | Finney et al. ................ 375/354 |
| 5,600,824 | A | 2/1997 | Williams et al. ............. 713/400 |
| 5,915,107 | A | 6/1999 | Maley et al. ................ 395/551 |
| 5,923,193 | A | 7/1999 | Bloch et al. ................. 327/141 |
| 5,923,858 | A | 7/1999 | Kanekal ..................... 395/287 |
| 6,000,022 | A | 12/1999 | Manning .................... 711/167 |
| 6,006,340 | A | 12/1999 | O'Connell .................. 713/600 |
| 6,016,549 | A | 1/2000 | Matsushiba et al. ......... 713/324 |
| 6,112,307 | A | 8/2000 | Ajanovic et al. ............ 713/400 |
| 6,128,749 | A | 10/2000 | McDonnell et al. ......... 713/600 |
| 6,134,638 | A | 10/2000 | Olarig et al. ................ 711/167 |

(Continued)

OTHER PUBLICATIONS

Microsoft Dictionary, 1999, Microsoft Press, Fourth Edition, pp. 159 and 399.

*Primary Examiner*—Tuan V Thai
*Assistant Examiner*—Midys Rojas
(74) *Attorney, Agent, or Firm*—Dorsey & Whitney LLP

(57) ABSTRACT

A sequence state matrix has a plurality of time slots for storing a plurality of memory device signals. The memory device signals are loaded into the matrix by a sequencer load unit, which loads the memory device signals at locations in the matrix corresponding to the times that the signals will be coupled to a memory device. The sequencer load unit loads the signals into the matrix at a rate corresponding to a frequency of a system clock signal controlling the operation of the electronic system. A first in, first out ("FIFO") buffer receives the memory device signals from the sequence state matrix at a rate corresponding to the frequency of the system clock signal. A command selector transfers the memory device signals from the FIFO buffer to the memory device at a rate corresponding to the frequency of a memory clock signal controlling the operation of the memory device.

17 Claims, 4 Drawing Sheets

U.S. PATENT DOCUMENTS

| | | | |
|---|---|---|---|
| 6,202,119 B1 | 3/2001 | Manning | 711/5 |
| 6,279,077 B1 | 8/2001 | Nasserbakht et al. | 711/118 |
| 6,279,090 B1 | 8/2001 | Manning | 711/167 |
| 6,363,076 B1 | 3/2002 | Allison et al. | 370/419 |
| 6,370,600 B1 | 4/2002 | Hughes et al. | 710/29 |
| 6,389,529 B1 | 5/2002 | Arimilli et al. | 712/225 |
| 6,414,903 B1 | 7/2002 | Keeth et al. | 365/233 |
| 6,434,684 B1 | 8/2002 | Manning | 711/167 |
| 6,449,703 B2 | 9/2002 | Jeddeloh | 711/169 |
| 6,526,469 B1 | 2/2003 | Drehmel et al. | 710/306 |
| 6,542,569 B2 | 4/2003 | Manning | 377/64 |
| 6,542,980 B1 * | 4/2003 | Chapelle et al. | 711/202 |
| 6,546,451 B1 | 4/2003 | Venkataraman et al. | 710/317 |
| 6,590,901 B1 | 7/2003 | Jones | 370/428 |
| 6,594,713 B1 | 7/2003 | Fuoco et al. | 710/31 |
| 6,622,228 B2 | 9/2003 | Jeddeloh | 711/169 |
| 6,718,449 B2 | 4/2004 | Phi | 711/167 |
| 6,775,755 B2 | 8/2004 | Manning | 711/167 |
| 2003/0169757 A1 * | 9/2003 | LaVigne et al. | 370/413 |
| 2007/0086480 A1 * | 4/2007 | Elzur | 370/463 |

* cited by examiner

MEMORY DEVICE SEQUENCER AND METHOD SUPPORTING MULTIPLE MEMORY DEVICE CLOCK SPEEDS

CROSS REFERENCE TO RELATED APPLICATION

This application is a continuation of pending U.S. patent application Ser. No. 10/155,668, filed May 24, 2002.

TECHNICAL FIELD

This invention relates to memory devices, and more particularly to a system and method for interfacing a memory device to a system in which the system and memory device may operate at different clock speeds.

BACKGROUND OF THE INVENTION

Memory devices, such as dynamic random access memories ("DRAMs") may operate either asynchronously or synchronously. When operating synchronously, the operation of the memory device is controlled by a clock signal, and the speed at which the memory device operates is thus determined by the frequency of the clock signal. The memory device may be interfaced with an electronic device, such as a computer system, that is also operated synchronously at a frequency determined by its own clock signal, known as the system clock signal. Generally, the frequency of the system clock signal is the same as the frequency of the memory clock signal. However, it is often possible for a memory device to operate at a higher speed than the speed corresponding to the frequency of the system clock signal. In such case, the memory clock signal may have a higher frequency than the frequency of the system clock signal.

If a memory device synchronized to a relatively high speed memory clock signal could be interfaced with a system synchronized to a relatively slow speed system clock signal, it might be possible to increase the speed at which data could be written to or read from the memory device. However, it can be difficult to interface a memory device operating according to a memory clock signal having one frequency with an electronic system operating according to a system clock having a different, usually slower, frequency. This difficulty stems from the fact that the different clock frequencies inherently prevents the memory device from operating in synchronism with the electronic system.

There is therefore a need for a system and method for allowing a memory device operating in synchronism with a memory clock signal to interface with an electronic system operating in synchronism with a system clock signal having a frequency that may be different from the frequency of the memory clock signal.

SUMMARY OF THE INVENTION

A sequencer is used to transfer memory device signals, such as command, addresses and data signals, from an electronic system operating at a system clock speed to a memory device operating at a higher memory clock speed. The sequencer includes a sequencer state matrix into which the memory device signals are loaded in the order in which they will be applied to the memory device. The memory device signals are loaded into the sequence state matrix at the slower system clock speed. The memory device signals are then transferred from the sequence state matrix to a first in, first out buffer at the system clock speed, and are then transferred from the first in, first out buffer to the memory device at the higher memory clock speed.

DETAILED DESCRIPTION OF THE INVENTION

Figure 1:
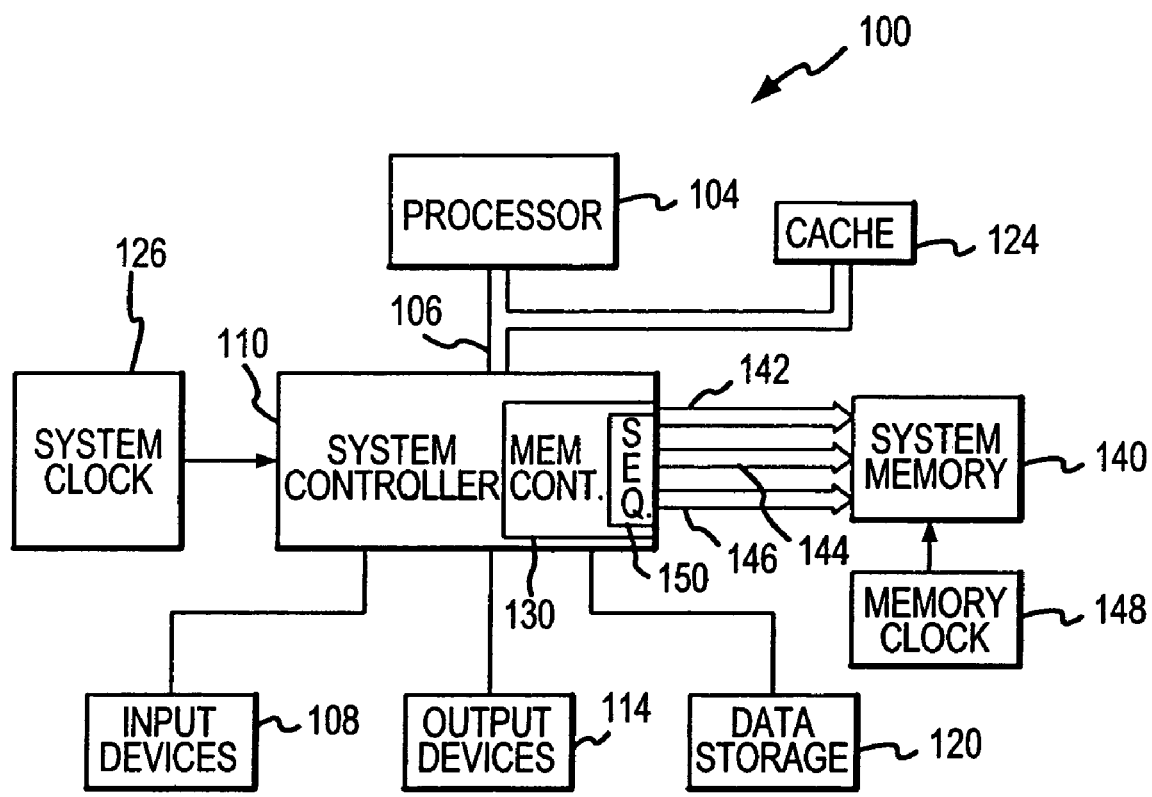
FIG. 1 is a block diagram of a computer system according to one embodiment of the present invention.

A computer system 100 according to one embodiment of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. In addition, the computer system 100 includes one or more input devices 108, such as a keyboard or a mouse, coupled to the processor 104 through a system controller 110 to allow an operator to interface with the computer system 100. Typically, the computer system 100 also includes one or more output devices 114 coupled to the processor 104 through the system controller 110, such output devices typically being a printer or a video terminal. One or more data storage devices 120 are also typically coupled to the processor 104 through the system controller 110 to allow the processor 104 to store data or retrieve data from internal or external storage media (not shown). Examples of typical storage devices 120 include hard and floppy disks, tape cassettes, and compact disk read-only memories (CD-ROMs). The processor 104 is also typically coupled to cache memory 124, which is usually static random access memory ("SRAM").

The computer system 100 includes a system clock 126 that is coupled to the system controller 110 and may be coupled to other components in the computer system 100. The system clock 126 generates a system clock signal to which the operation of system controller 110 is synchronized.

The system controller 110 also includes a memory controller 130 for controlling access to a system memory 140, which may be a synchronous dynamic random access memory ("SDRAM"). The operation of the memory controller 130 is also synchronized to the system clock signal generated by the system clock 126. The memory controller 130 allows the processor 104 to write data to and read data from the system memory 140, and may also allow other devices (not shown) to write data to and read data from the system memory 140 in a direct memory operation, as is well known in the art. The memory controller 130 is coupled to the system memory 140 through a control bus 142, an address bus 144 and a data bus 146. The operation of the system memory 140 is synchronized to a memory clock signal generated by a memory clock 148. The frequency of the memory clock signal is preferably greater than the frequency of the system clock signal generated by the system clock 126 so that data can be written to and read from the system memory 140 at a faster rate. Significantly, the memory controller 130 includes a sequencer 150 that allows the system memory 140 operating at a speed controlled by the memory clock signal to interface with other components of the computer system 100 operating at a slower speed corresponding to the frequency of the system clock signal.

Figure 2:
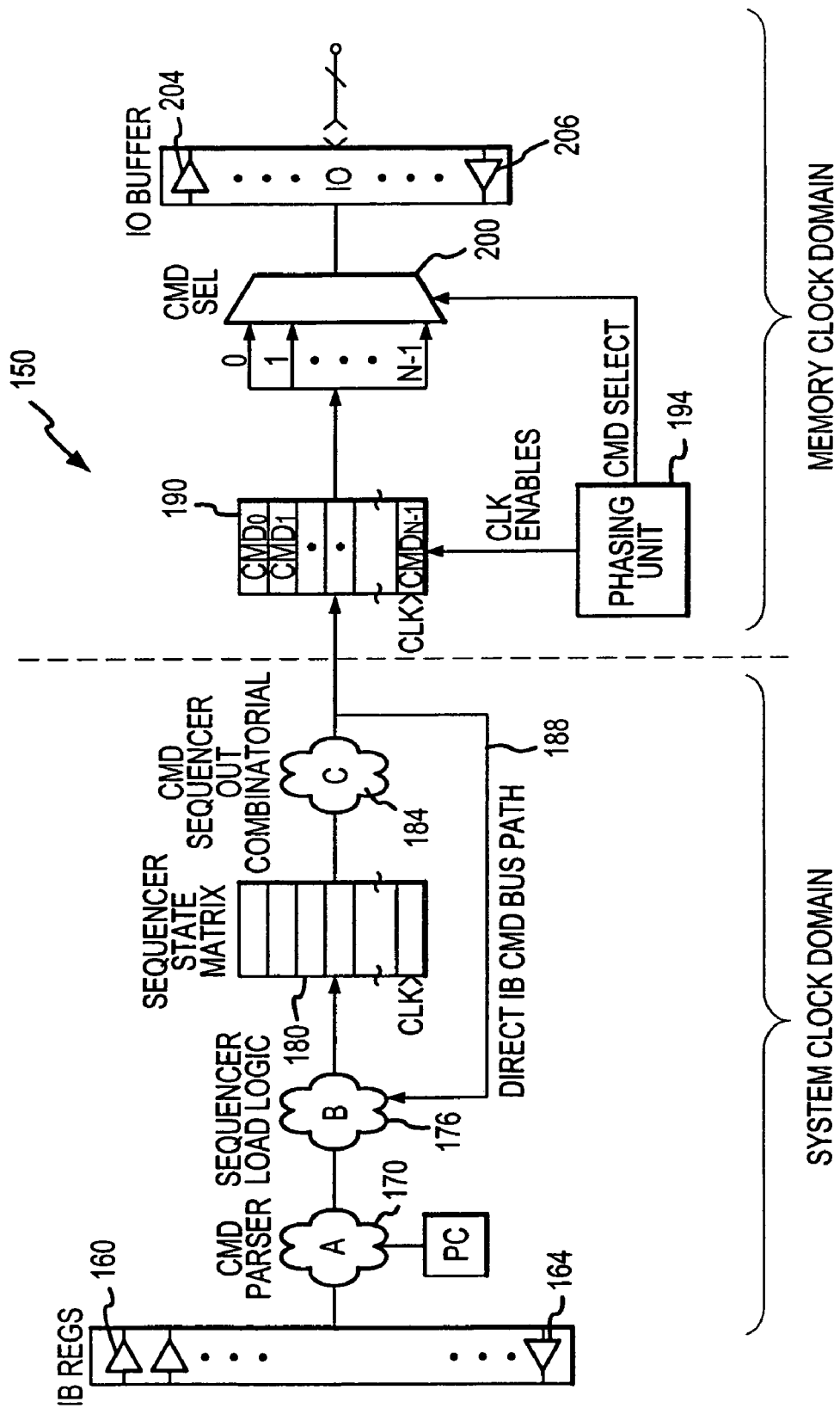
FIG. 2 is a block diagram of a sequencer used in the computer system of FIG. 1.

One embodiment of the sequencer 150 is shown in FIG. 2. The sequencer includes a large number of input registers 160 into which control, address and write data signals are clocked responsive to rising, falling or both rising and falling edge of the clock signal from the system clock 126 (FIG. 1). Also included are a large number of output registers 164 from which read data signals are clocked responsive to rising, falling or both rising and falling edge of the clock signal from the system clock 126. In general, an input register 160 is provided for each control signal and address bit coupled to the system memory 140, and an input register 160 and an output register 164 is provided for each data bit coupled to and from the system memory 140.

The memory device signals coupled through the input registers 160 are applied to a command parser 170, which analyzes the memory device signals and determines individual commands corresponding to combinations of the memory device command signals. The command parser 170 applies signals indicative of the individual commands to a sequencer load logic unit 176, which has an output bus coupled to a sequencer state matrix 180. The sequencer state matrix is essentially a set of first in, first out buffers operating in synchronism with each other, with a separate buffer being provided for each memory device signal. The load logic unit 176 examines the individual commands to determine the time slot in which each of the commands can be applied to the system memory 140. The commands are then loaded into the sequencer state matrix 180 at locations corresponding to the respective time slots. The time slots selected for being loaded with the commands thus correspond to the times at which the commands can be applied to the system memory 140 at the frequency of the memory clock signal generated by the memory clock 148.

It is important that the time slots at which the commands are applied to the system memory 140 not conflict with each other. For this reason, a combinatorial unit 184 examines the commands that have been loaded into the sequencer state matrix 180. The combinatorial unit 184 then provides information signals to the sequencer load logic unit 176 via path 188 indicative of the nature and location of all commands that have already been loaded into the sequencer state matrix 180. Using this information, the sequencer load logic unit 176 can determine locations in the matrix 180 where additional command can be loaded into the matrix 180 without causing a conflict when the commands are subsequently applied to the system memory 140.

The command parser 170, the sequencer load logic unit 176, the sequencer state matrix 180 and the combinatorial unit 184 are preferably respective logic circuits, the design of which will be apparent to one skilled in the art. The operation of all of these units is synchronized to the system clock signal generated by the system clock system clock 126, although, as previously mentioned, the time slots in the matrix 180 into which the commands and addresses are loaded correspond to the times at which the commands can be applied to the system memory 140 at the frequency of the memory clock signal generated by the memory clock 148.

Once the commands and addresses have been loaded into the sequencer state matrix 180, they are transferred to a first in, first out (FIFO) buffer 190 at a rate corresponding to the frequency of the system clock signal. However, the system clock signal from the system clock 126 is not used to load the commands and addressed into the buffer 190. Instead, the commands and addressed are loaded into the FIFO buffer 190 responsive to a first clock signal from a phasing unit 194. A second clock signal is generated by the phasing unit 194, which is applied to a command selector 200. The command selector 200 transfers the commands and addresses from the FIFO buffer in the same order that the buffer 190 was loaded at a rate determined by the second clock signal. The second clock signal has a frequency that corresponds to the memory clock signal from the memory clock 148. Thus, the frequency ratio between the first and second clock signals from the phasing unit 194 corresponds to the frequency ratio between the system clock signal and the memory clock signal. The phasing unit 194 thus compensates for the difference between the frequency of the system clock signal and the frequency of the memory clock signal.

The commands and addresses coupled from the FIFO buffer 190 by the command selector 200 are coupled to the system memory 140 through a set of output buffers 204, and the data are coupled to and from the system memory 140 through a set of output buffers 204 and input buffers 206.

Figure 3A:
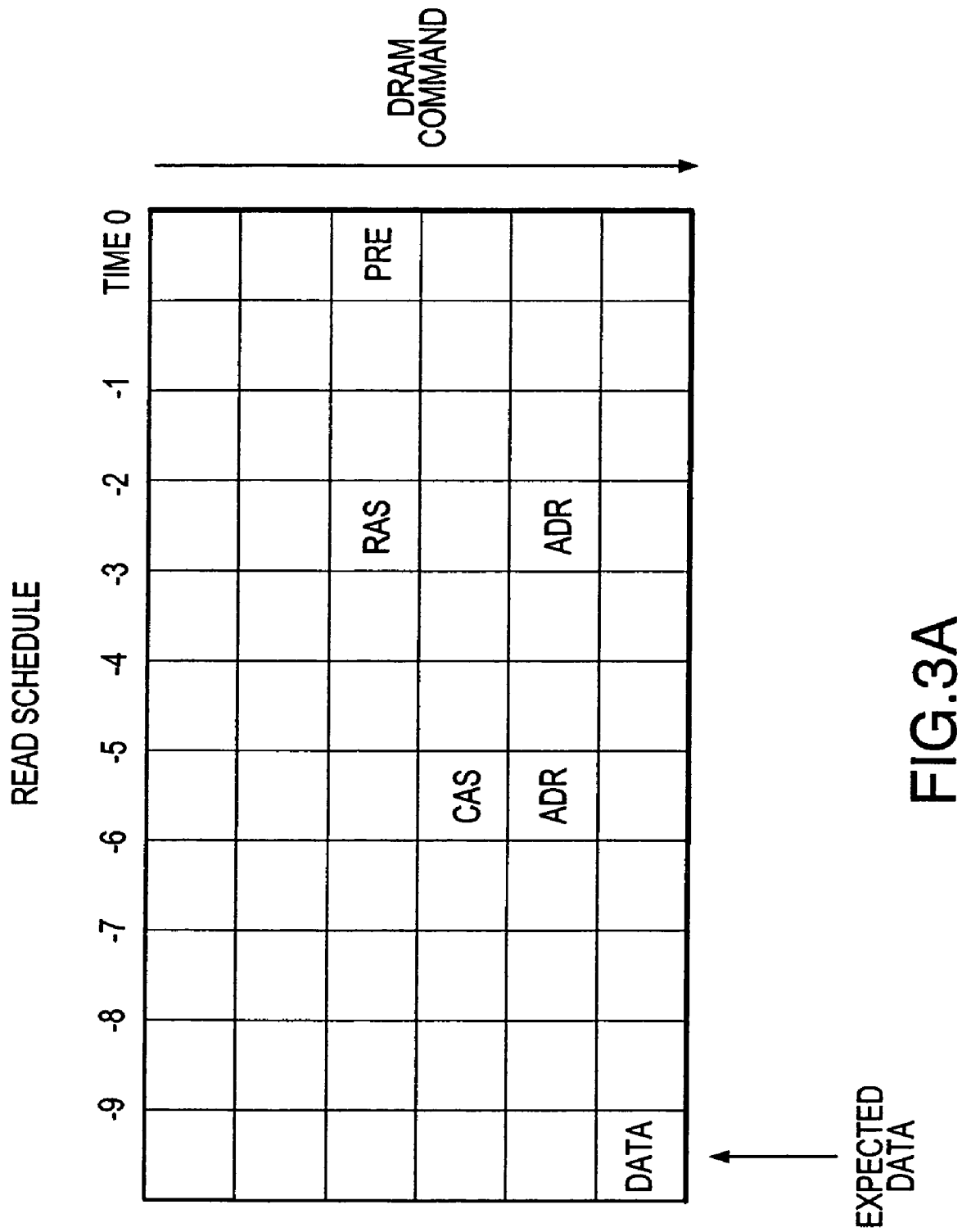
FIGS. 3A-3C are matrix diagrams showing the operation of the sequencer of FIG. 2.

The manner in which the commands are loaded into the sequencer state matrix 180 will now be explained with reference to FIGS. 3A-3C. With reference to FIG. 3A, for a memory clock signal frequency of 200 MHz, a precharge is loaded into the matrix 180 at time $t_0$. During the next two time slots, $t_1$ and $t_2$, the system memory 140 is being precharged. Since the period of a 200 MHz clock signal is 5 ns, a total of 10 ns is therefore allocated for precharging the system memory 140. The RAS command as well as the row address that will be strobed into the system memory 140 by the RAS command are then loaded into the matrix 180 at time $t_3$. After a delay of two more time slots, $t_4$ and $t_5$, or 10 ns, a column address and a CAS command that will strobe the column address into the system memory 140 are loaded into time slot $t_6$ of the matrix 180. Finally, a time slot $t_{10}$ is reserved in the matrix 180 to receive the read data. By reserving space in the matrix 180 to receive data, the sequencer load logic 176 avoids inserting a command in the matrix 180 that would be applied to the memory 140 at the same time read data is being output from the memory 140.

Figure 3B:
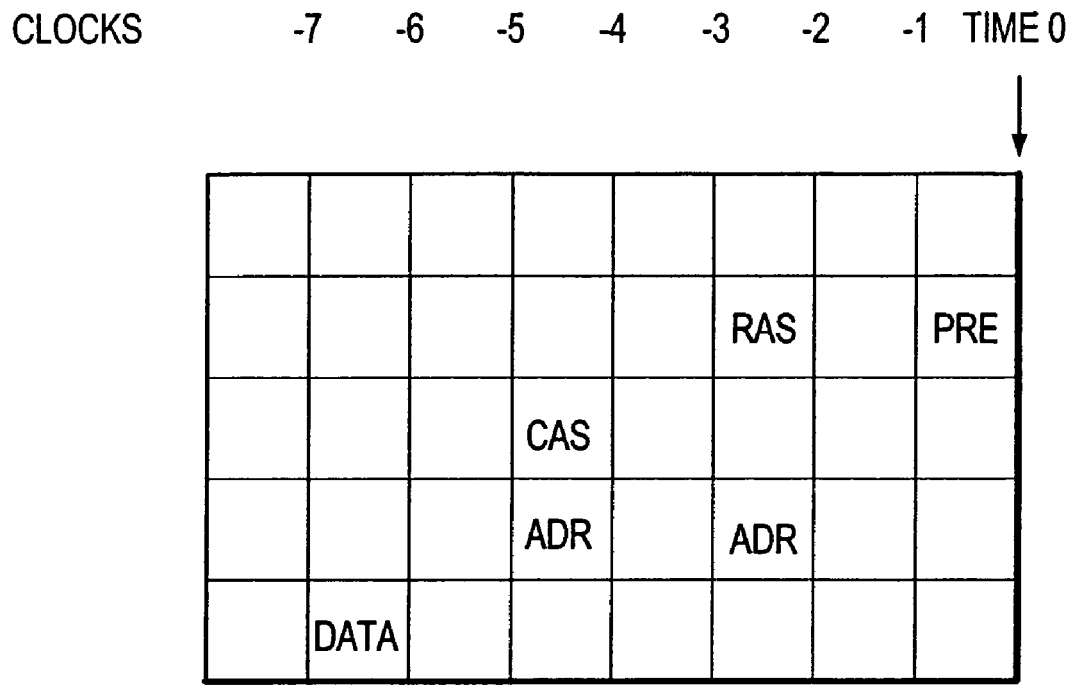

In contrast to a memory read at a clock frequency of 200 MHz, the sequencer state matrix 180 may be loaded for a memory read at 100 MHz as shown in FIG. 3B. The precharge command is again loaded into the time slot $t_0$ of the matrix 180, but the RAS command and row address can be loaded into time slot $t_2$ because the lower clock frequency provides a 10 ns precharge time with only a single clock period. In contrast, at a frequency of 200 MHz, it was necessary to load the RAS command and row address into time slot $t_3$. Similarly, the CAS command and column address can be loaded into time slot $t_4$ in contrast to being loaded at time slot $t_6$ at 200 MHz, as shown in FIG. 3A. Finally, time slot $t_6$ is reserved in the matrix 180 for the read data, in contrast to time slot $t_{10}$ being reserved at 200 MHz, as shown in FIG. 3A.

Figure 3C:
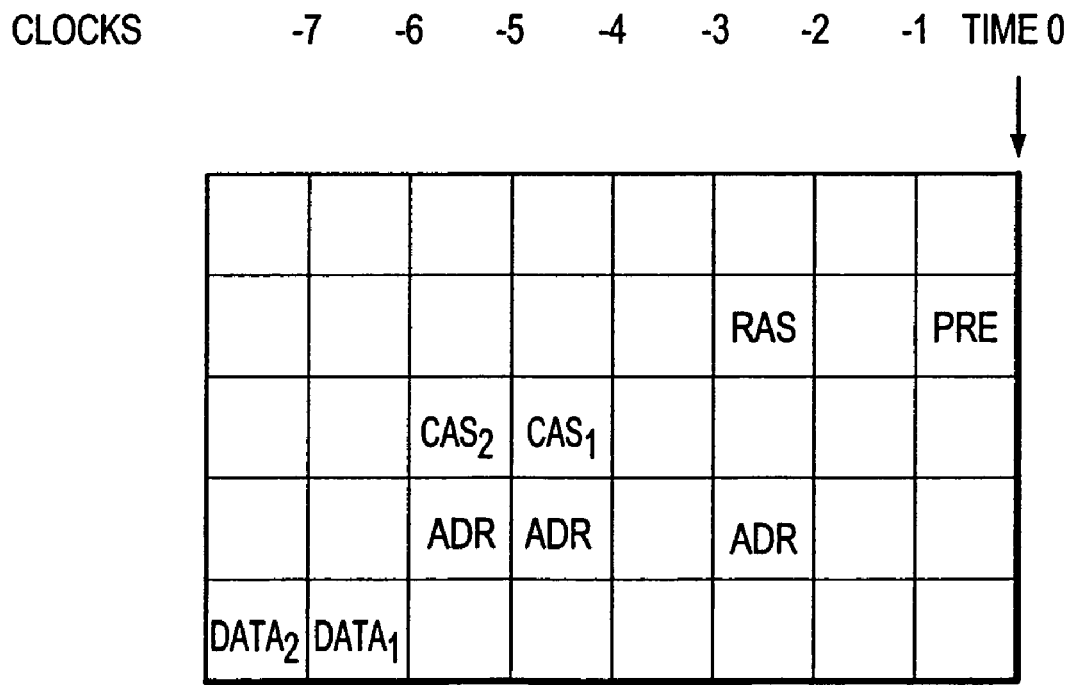

FIG. 3C shows the manner in which memory commands are stored in the sequencer state matrix 180 in the event of a read from two columns of the same page. As in the example shown in FIG. 3B, the precharge command is loaded into time slot $t_0$, and the RAS command and row address are loaded into time slot $t_2$. Also, the CAS command and column address are again loaded into time slot $t_4$, and time slot $t_6$ is reserved for the data read from the addressed column. However, because a subsequent read is from the same page as the earlier read, the sequencer load logic unit 176 loads the CAS command and the column address for the subsequent read at time $t_5$, and time slot $t_7$ is reserved for the data read from the column addressed in time slot $t_5$.

In each of the cases shown in FIGS. 3A-3C, the number of commands that must be loaded into the sequencer state matrix 180 each period of the system clock signal will depend on the number of commands transferred from the matrix 180 each period of the memory clock signal. For example, for a system clock signal frequency of 200 and a memory clock signal frequency of 400 MHz, the number of commands loaded into the matrix 180 for each period of the system clock signal must be twice the number of commands transferred from the matrix 180 for each period of the memory clock signal so that commands are transferred into and out of the matrix 180 at the same average rate.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of coupling a plurality of memory device signals to a memory device, comprising:
    latching the plurality of memory device signals in response to a system clock signal;
    storing the plurality of memory device signals in a sequence state matrix, the sequence state matrix having a plurality of time slots, the memory device signals being assigned to a respective time slot corresponding to a clock speed of the memory device;
    transferring the plurality of memory device signals from the sequence state matrix to a first in, first out ("FIFO") buffer at a first rate; and
    transferring the memory device signals from the FIFO buffer to the memory device in accordance with their assigned time slots at a second rate, the second rate being different from the first rate.

2. The method of claim 1 wherein the second rate is faster than the first rate.

3. The method of claim 1 wherein the memory device signals comprise memory command signals.

4. The method of claim 1 wherein the memory device signals comprise memory address signals.

5. The method of claim 1 wherein the memory device signals comprise data signals.

6. The method of claim 1 wherein the act of storing the memory device signals in a sequence state matrix at a first rate comprises:
    receiving the memory device signals that are to be stored in the sequence state matrix;
    examining the memory device signals that are already stored in the sequence state matrix and that have not been transferred from the sequence state matrix; and
    based on the examination of the device signals that are already stored in the sequence state matrix and that have not been transferred from the sequence state matrix, storing the received memory device signals in the sequence state matrix.

7. A method of coupling memory device signals to a memory device, comprising:
    latching memory device signals at a first rate in response to a system clock signal;
    storing the memory device signals in a sequence state matrix, the memory device signals being stored at locations corresponding to a frequency of a memory clock signal;
    transferring the memory device signals to a first in, first out ("FIFO") buffer at the first rate; and
    transferring the memory device signals from the FIFO buffer to the memory device at a second rate, the second rate corresponding to the frequency of the memory clock signal, wherein the second rate is faster than the first rate.

8. The method of claim 7 wherein the memory device signals comprise memory command signals.

9. The method of claim 7 wherein the memory device signals comprise memory address signals.

10. The method of claim 7 wherein the memory device signals comprise data signals.

11. The method of claim 7 wherein the act of transferring the memory device signals in a first in, first out ("FIFO") buffer at a first rate further comprises storing the memory device signal in the first in, first out ("FIFO") buffer in response to a clock signal other than the system clock signal and the memory clock signal.

12. The method of claim 11 wherein the act of storing the memory device signals in the sequence state matrix comprises storing the memory device signals in the sequence state matrix at the first rate.

13. The method of claim 11 wherein the act of storing the memory device signals in the sequence state matrix comprises:
    receiving the memory device signals that are to be stored in the sequence state matrix;
    examining the memory device signals that are already stored in the sequence state matrix and that have not been transferred from the FIFO buffer; and
    based on the examination of the device signals that are already stored in the sequence state matrix and that have not been transferred from the sequence state matrix, storing the received memory device signals in the sequence state matrix.

14. A method of coupling a plurality of memory device signals to a memory device, comprising:
    latching the plurality of memory device signals in response to a first clock;
    loading each of the plurality of memory device signals into a respective time slot of a plurality of time slots in a sequence state matrix at a first rate, the time slots into which the memory device signals are loaded corresponding to clock speed of a second clock, the second clock being different from the first clock; and
    transferring the plurality of memory device signals from their respective time slot to the memory device at a second rate, the second rate being different from the first rate.

15. The method of claim 14 wherein the second rate is faster than the first rate.

16. The method of claim 14 wherein the memory device signals comprise at least one of memory command signals, memory address signals, and memory data signals.

17. The method of claim 14 further comprising transferring the memory device signals from the sequence state matrix to the memory device in accordance with their assigned time slots.

* * * * *

UNITED STATES PATENT AND TRADEMARK OFFICE
CERTIFICATE OF CORRECTION

PATENT NO. : 7,620,788 B2 Page 1 of 1
APPLICATION NO. : 11/211848
DATED : November 17, 2009
INVENTOR(S) : Joseph M. Jeddeloh It is certified that error appears in the above-identified patent and that said Letters Patent is hereby corrected as shown below:

In column 6, line 44, in Claim 14, after "to" insert -- a --.

Signed and Sealed this

Twelfth Day of January, 2010

David J. Kappos
*Director of the United States Patent and Trademark Office*